United States Patent
Guillet et al.

[15] 3,643,568
[45] Feb. 22, 1972

[54] LASER SYNCHRONIZING ARRANGEMENT FOR PHOTOGRAPHIC ILLUMINATION

[72] Inventors: Hubert Guillet, Arpajon; Denis Le Goff, Enghien, both of France

[73] Assignee: Compagnie Generale D'Electricite, Paris, France

[22] Filed: Sept. 15, 1969

[21] Appl. No.: 858,056

[30] Foreign Application Priority Data

Sept. 13, 1968  France .................................. 166255

[52] U.S. Cl. .............................. 95/11.5 R, 240/1.3, 352/84
[51] Int. Cl. .......................................................... G03b 9/70
[58] Field of Search .................. 95/11.5 R; 346/108; 352/84; 350/275, 285, 286

[56] References Cited

UNITED STATES PATENTS

| | | | |
|---|---|---|---|
| 3,366,439 | 1/1968 | Buck et al. | 95/11.5 X |
| 3,380,358 | 4/1968 | Neumann | 95/11.5 |
| 3,434,073 | 3/1969 | Forkner | 350/286 X |

OTHER PUBLICATIONS

Sooy, W. R., et al., " Switching of Semiconductor Reflectivity by a Giant Pulse Laser," Applied Physics Letters, Volume 5, No. 3, August 1, 1964 pp. 54–56; pertinent matter: Figure Primary Examiner—John M. Horan
Assistant Examiner—Kenneth C. Hutchison
Attorney—Sughrue, Rothwell, Mion, Zinn & Macpeak

[57] ABSTRACT

A laser synchronization system synchronizes the emission of a light pulse on a laser triggered by a rotating mirror and the control of the exposure of a photographic camera by means of a light pulse. The system comprises a light detector connected to the camera and is adapted to supply an electrical pulse suitable for controlling the camera. An auxiliary light source in the form of an auxiliary laser directs a light beam through an optical system onto the light detector when the rotating mirror is in appropriate angular position. Two semitransparent mirrors define the optical resonating cavity of the auxiliary laser, and the auxiliary laser emits light in two opposite directions in the form of a visual display beam and a synchronizing beam whereby a visual display of the path of light emitted by the triggered laser is achieved by a continuous light beam supplied by the auxiliary light source.

8 Claims, 1 Drawing Figure

PATENTED FEB 22 1972 3,643,568
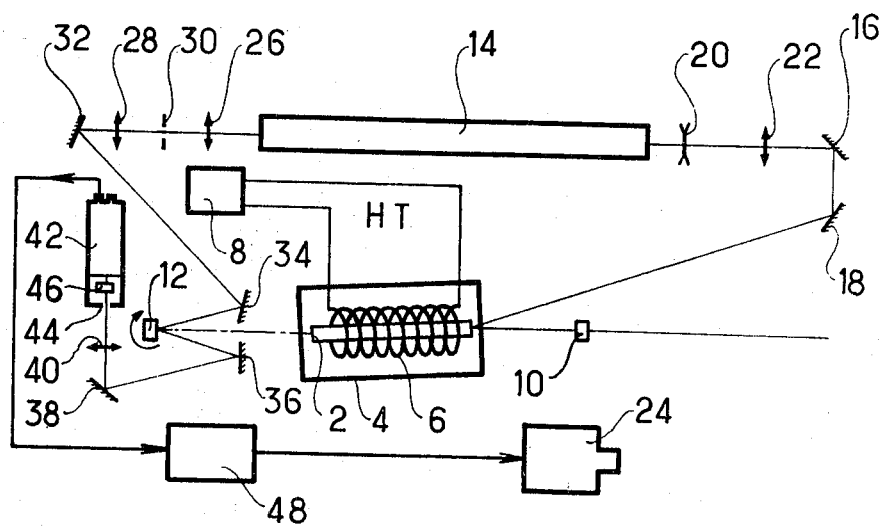

LASER SYNCHRONIZING ARRANGEMENT FOR PHOTOGRAPHIC ILLUMINATION

BACKGROUND OF THE INVENTION

1. Field of he Invention

The present invention concerns synchronization between an apparatus and a laser triggered with the aid of a rotating prism.

2. Description of the Prior Art

It is known that, in such lasers, the light-amplifying medium is inserted in an optical resonating cavity which is closed by the passage of a rotating mirror through an appropriate angular portion; the triggering resulting from this closing. The light pulse which is then emitted is very short. Therefore, when an apparatus must be controlled for utilizing this light pulse, this control must be effected timely with very high precision. This is the case, more particularly, when the apparatus is of the photographic type and the light pulse in question is employed to illuminate the photographed object.

It is known to provide, in association with a photographic camera, a flash lamp for illuminating the photographed object at the instant when the exposure is made. Synchronization is then effected between the control of the photographic camera and that of the flash lamp, either by virtue of the fact that the two control systems have a common part or by virtue of the fact that the flash lamp is controlled by the camera.

Owing to the shortness of the light pulse emitted by a laser, the duration of such a pulse being of the order of 30 nanoseconds, for example, the devices usually employed for synchronous control in photography are much too inaccurate when the illumination is effected by means of a triggered laser.

The present invention makes it possible to obviate this disadvantage, and concerns notably a laser synchronizing system which effects synchronization between the emission of a light pulse by a laser triggered by a rotating mirror, and the control of equipment in which this light pulse is utilized. The system is distinguished in that it comprises an auxiliary light source which sends a light beam to an optical element fixed to the rotating mirror, so that the beam is reflected by the element when the mirror is in an appropriate angular position, onto a light detector which is connected to the device and which is adapted to supply an electric pulse suitable for controlling the device.

BRIEF DESCRIPTION OF THE DRAWINGS

The single FIGURE is a schematic representation of the laser synchronization system of the present invention.

DESCRIPTION OF THE PREFERRED EMBODIMENT

A rod 2 constitutes the amplifying medium of a triggered laser. The rod 2 may consist, for example, of yttrium and aluminum garnet or of ruby or of neodymium-doped glass. It is disposed inside an enclosure 4 and surrounded by a flash tube 6 connected to its electric supply 8. The flash tube 6, which is helically coiled around the rod 2, is intended to effect the optical pumping. The rod 2 terminates at its two ends in conventional manner by two plane faces parallel to one another and at an angle to its axis which is slightly different from 90°, so as to prevent disturbance of the simulated light pulse by parasitic reflections.

The laser in question also comprises a semitransparent mirror 10 which allows the output light pulse to pass. The optical resonating cavity comprises, in addition to the mirror 10, a rotating totally reflecting prism 12, the axis of rotation of which is perpendicular to the plane of the figure.

Before the laser just described is triggered, it is desirable to ensure that it is appropriately oriented, and for this purpose to display visually the path of the light which it can emit in the form of a brief pulse. This visual display is effected with the aid of an auxiliary continuous light beam directed onto the forward face of the rod 2 and reflected by the latter in the direction of emission of the main light pulse. The auxiliary beam is supplied by a gas laser 14, the power of which may be relatively low. It is directed onto the rod 2 through the intermediary of two appropriately oriented mirrors 16 and 18 and of an afocal system consisting of lenses 20 and 22.

A camera 24 is directed parallel to the direction of emission of the main light pulse, this pulse being intended to illuminate the object to be photographed. The synchronization between the control of the camera 24 and the emission of the light pulse is effected as follows: the gas laser 14, which may be of the helium-neon type for example, comprises an optical resonating cavity consisting of two semitransparent mirrors and supplies, not one, but two continuous light beams. The function of the more powerful one of these beams, which is emitted in the direction of the lens 20, has already been described. The second and less powerful of these beams is received by an afocal system consisting of two convergent lenses 26 and 28 in the common focal plane of which there is situated a vertical slot 30 (i.e., a slot perpendicular to the plane of the figure). The slot 30, the width of which is about 30 microns, enables a beam of very small divergence to be selected. This beam is directed by means of a mirror 32 to a mirror 34 which in turn reflects it in the direction of the rotating prism 12. For a well-determined angular position of the said rotating prism, corresponding substantially to that which effects the triggering of the triggered laser, this beam is reflected by the prism 12 onto a mirror 36 which, through the intermediary of another mirror 38 and of lens 40, directs it onto a photomultiplier 42 preceded by a slot 44 parallel to the slot 30. The slot 44 is situated at the focal point of the lens 40 with the interposition of an interference filter 46 adjusted to the wavelength of the gas laser 14. The presence of the slots 30 and 44 enables the photomultiplier 42 to supply a very brief electric pulse at the appropriate instant. This pulse, which is shaped at 48 after amplification, effects the control of the camera 24.

The photomultiplier 42 is disposed behind the rotating prism 12 so that the device for protecting and driving the latter (not shown) forms a screen against the light emitted by the triggered laser and by its flash tube 6. The assembly comprising the photomultiplier 42, the lens 40, the slot 44 and the filter 46 may be displaced perpendicularly to the light beam which it receives, with the aid of a micrometric screw, so as to permit a fine adjustment of the position in time of the pulse emitted by the photomultiplier in relation to the light pulse of the triggered laser.

There was obtained with the device just described an electric synchronizing pulse adjustable between −20 µs. and +20 µs. in relation to the instant of emission of the light pulse, to within less than 10 nanoseconds.

The instability of the value of the time displayed from one shot to the other was less than ±4 ns. for times shorter than 400 ns. and less than ±1 percent for times longer than 500 nanoseconds.

It is obvious that many modifications may be made to the device illustrated and described without departing from the scope of the present invention. The controlled apparatus, may notably be of various natures and, for example, may consist of an optical member serving to condition the emitted light pulse, or it may be intended to close an enclosure immediately after the emission of a light pulse, etc. Likewise, the auxiliary light beam may be reflected, not from the rotating mirror for the luminous triggering, but from another mirror rotating integrally therewith, etc.

We claim:

1. A laser synchronization system for synchronizing the emission of a light pulse on a laser triggered by a rotating mirror and the control of an apparatus utilizing said light pulse, said system comprising:
   a light detector connected to the apparatus and adapted to supply an electric pulse suitable for controlling said apparatus,
   an auxiliary light source,
   optical means for directing a light beam from said auxiliary light source onto said light detector when said rotating mirror is in an appropriate angular position, said auxiliary light source comprising an auxiliary laser, two semitransparent mirrors defining the optical resonating cavity of said auxiliary laser with said auxiliary laser emitting in two opposite directions a visual display beam and a synchronizing beam, whereby: a visual display of the path of the light emitted by said triggered laser is achieved by a continuous light beam supplied by said light source.

2. The system as claimed in claim 1 wherein said apparatus comprises a photographic camera and the exposures thereof are synchronized with the triggering of said laser.

3. The system as claimed in claim 1 further comprising means defining two parallel, narrow slots through which said synchronizing beam passes respectively before and after its reflection from said rotating mirror.

4. The system as claimed in claim 1 wherein the power of the synchronizing laser beam is lower than that of the visual display beam.

5. The system as claimed in claim 4, wherein those parts of said synchronizing beam which are situated immediately in front of and behind said rotating mirror form when projected onto a plane perpendicular to the axis of rotation of said mirror, an acute angle within which said triggered laser is situated.

6. The system as claimed in claim 4, further comprising means defining two parallel, narrow slots through which said synchronizing beam passes respectively before and after its reflection from said rotating mirror.

7. The system as claimed in claim 1 wherein those parts of said synchronizing beam which are situated immediately in front of and behind said rotating mirror form when projected onto a plane perpendicular to the axis of rotation of said mirror, an acute angle within which, said triggered laser is situated.

8. The system as claimed in claim 7, further comprising means defining two parallel, narrow slots through which said synchronizing beam passes respectively before and after its reflection from said rotating mirror.

* * * * *